Patented Aug. 12, 1952

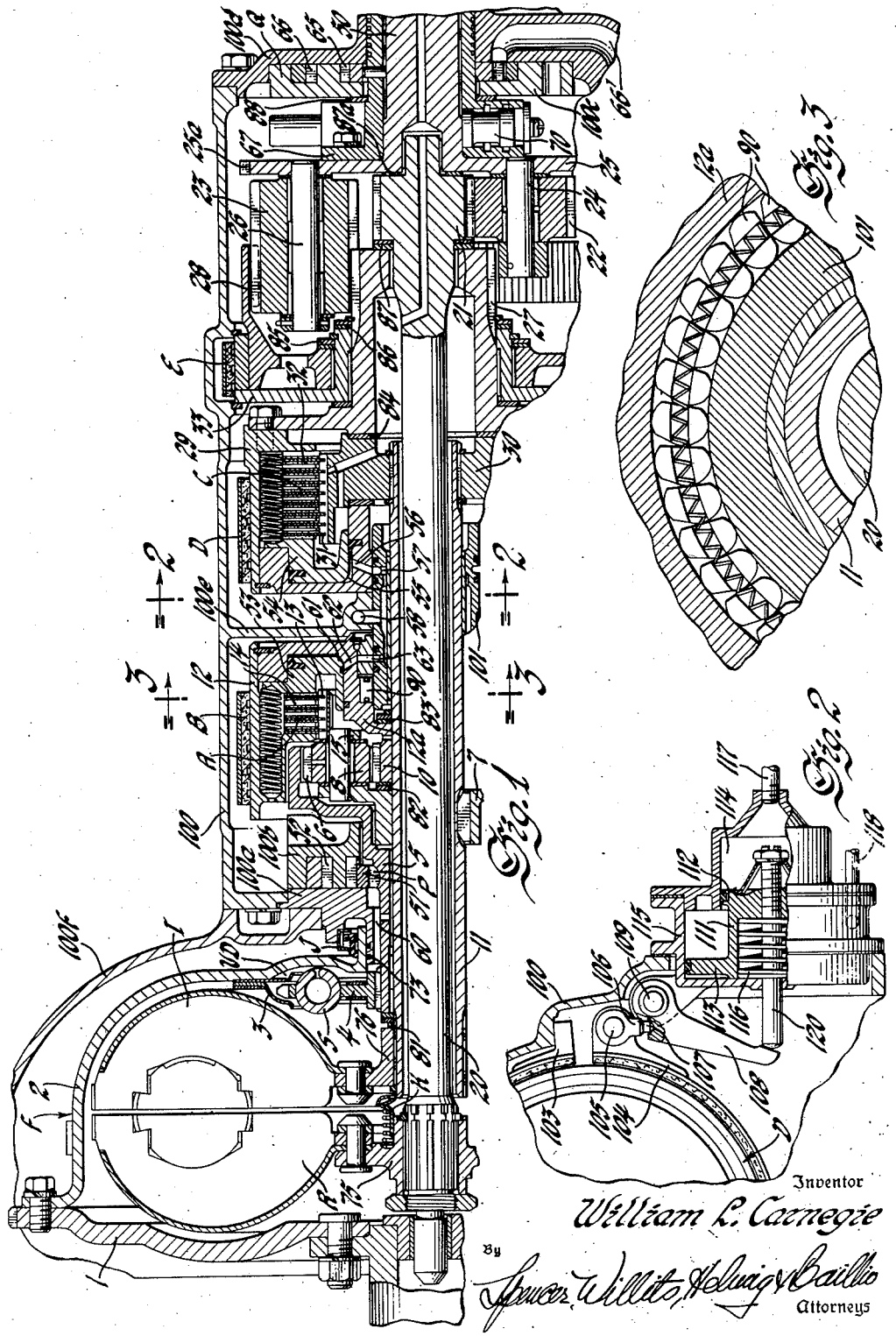

2,606,459

UNITED STATES PATENT OFFICE 2,606,459

COMPOUND PLANETARY GEAR TRAIN

William L. Carnegie, Detroit, Mich., assignor to General Motors Corporation, Detroit, Mich., a corporation of Delaware Application December 6, 1947, Serial No. 790,110

16 Claims. (Cl. 74—682)

The present invention relates to compounded planetary gearing arrangements combined with fluid turbine devices in which combinations benefits are provided in the utilizing of trains in which the torque is divided and recombined between the engine and output shaft, such as for vehicle drives.

It relates more particularly to plural step ratio gearing in such combinations which are devised to provide selected scalar ranges of efficient drive ratios within the dividing and recombining combinations, the net efficiencies being proportional to the selected ratio ranges, within the torque capacities of the fluid turbine units so combined in the gear train sequences.

The art has already received examples of the general type of combinations to which the present invention belongs, in the form of two United States Letters Patents issued to Oliver K. Kelley, namely U. S. 2,176,138 issued October 17, 1939, and U. S. 2,211,233 issued August 13, 1940. In these patents the principle of dividing and recombining the torque is amply described. In the first of these patents a special form of gear train was described having a front unit and rear unit, the rear unit consisting of two cross-connected planetary groups, the primary input of which was two sun gears coupled together, the output of which was the annulus of the second group and the secondary input was the carrier of the first group. The annulus of the first group was constantly coupled to the sun gear of the second group.

The second of these patents in Fig. 4 provided a different rear unit arrangement, there being only one primary sun gear, that of the first group, its annulus being the secondary input coupling member and also coupled to the sun gear of the secondary group, the annulus gear of the latter being the reverse reaction member. The carriers of both groups were constantly coupled to output.

A third rear unit arrangement has appeared in the Letters Patent U. S. 2,377,696 to the same inventor. In this the primary input consists of two sun gears for each of the groups, the first group annulus gear being the secondary input, and the second group carrier being constantly coupled to output. The first group carrier was constantly coupled to the second group annulus gear. The third, reversing group was carrier-to-output connected, sun gear coupled to first group annulus, and obtained reverse reaction by stopping the annulus gear.

Experience with all of these forms of rear unit compounding has suggested improvements in size reduction, in lessening the net number of gears required for a desired range of ratios, and in arranging a train in which the idling speeds of the various gears would be considerably diminished, thereby lengthening the effective life of the mechanism and enabling the manufacturer to provide the public with variable speed transmissions of lower cost, sturdier construction, and better arranged for maintenance of true alignments.

These useful results are the general objects of the present invention.

Specifically, the new gear train arrangement of the present invention, as compared with the above-noted, patented constructions, does not have separate gear groups combined to form a rear unit, but obtains all of the advantages of the former gear train combinations in one compound planetary unit of unusual form and arrangement. It consists of a primary sun gear meshed with a short planet gear which is in turn meshed with a long planet gear of the same carrier member fixed to the output shaft. The long planet gear is also meshed with a sun gear which is the secondary input member of the train and is meshed also with an annulus gear, which is held stationary for establishing reverse drive reaction.

The long planet-short planet gear arrangement permits extremely close axial fitting of these parts so that a large saving in both axial and volumetric space is obtained, with a consequent net saving in overall weight of parts reflected in the cost of the unit.

The foregoing statements are particularly directed to the differences between the prior art disclosures and the present invention as affecting the construction of the rear unit of the construction herein described. There are likewise points of advantage derived in the combination relationships with the other members of the assembly which will be apparent in the following description, as understood by reference to the accompanying drawings, in which:

Fig. 1 is a longitudinal part-section of a transmission assembly built in accordance with the present invention as an example.

Fig. 2 is a sectional view taken at 2—2 of Fig. 1 to show the method of actuation for one of the reaction bands of the planetary gear train.

Fig. 3 is a part-section taken at 3—3 of Fig. 1 to show the construction of the one-way clutch used as a reaction locking device.

The engine flywheel 1, in Fig. 1 is attached to drum 2, for driving sleeve 5 of the front-unit annulus gear 6. A vibration damper device VD consisting of a two-part driving lug plate 3 and a serrated-flange hub 4 is flexibly coupled by coil springs S which occupy the interspaces between the lugs of plate 3 and hub 4.

The front unit carrier 7 supports planet gears 8 meshing with annulus 6 and with sun gear 10. The carrier 7 is fixed to rotate with sleeve 11 keyed to the hub of fluid flywheel impeller I and extends to the right where it is splined to the hub 30 for clutch plates 31 of the rear unit clutch C. The sun gear 10 is connected to drum 12 which overhangs the clutch A of the front unit, and supports plates 14 mating with plates 13 keyed to the hub 15 attached to the carrier 7. The drum 12 is braked by band B.

The fluid flywheel rotor R is splined to shaft 20 on which is formed at the right, sun gear 21 of the rear unit. Carrier 25 of the rear unit is extended at 50 to form the transmission output shaft, and carries meshing planet gears 22, 23 on spindles 24 and 26, respectively.

The short planet 22 meshes with sun gear 21 while the long planet 23 meshes internally with a sun gear 27, and externally with annulus gear 28. The sun gear 27 extends to the left where it is affixed to drum 29 which carries clutch plates 32 mating with plates 31 of hub 30, and is braked by band D.

The drum 33 fastened to annulus gear 28 is arranged to be held by a tooth-and-pawl arrangement or by a band E, as required, or by a combination of band and pawl, as will be understood further in detail.

The carrier 25 is toothed at 25a for coaction with a pawl to provide a parking brake.

The drive pattern of the gear assembly provides low gear drive by the locking or braking of bands B and D. When band B is held, the front unit planets 8 roll around the sun gear 10, imparting a slow-speed drive to the impeller I. The rotor R drives the sun gear 21 at the prevailing slip ratio of the fluid flywheel. With drum 29 stopped, any rotating moment applied to long planet 23 will result in corresponding rotation of carrier 25.

Since sun gear 21 receives forward rotation from rotor R, and since shaft 50 is initially held by the load thereon, the planet 22 endeavors to rotate reversely, at the same time rotating planet 23 forwardly, around the stopped sun gear 27. This applies a slow speed forward component to carrier 25 and shaft 50. This is low gear range.

The release of brake B and engagement of clutch A of the front unit now drives the fluid flywheel impeller I at engine speed because of the locking couple established between carrier 7 and sun gear 10. This drives shaft 50 at increased speed ratio, the reduction range being determined by the diameters of the rear unit gears involved in the drive. This is second gear range.

Now when the clutch C of the rear unit is engaged to connect sun gear 27 with sleeve 11 and the carrier 7 of the front unit, a different set of circumstances arises, for torque is now applied to the rear unit through two paths, one to each of its two sun gears 21 and 27.

If the front unit brake B is applied the torque of the engine is multiplied by the ratio of the front unit gears 6, 8 and 10, and the sleeve 11 thru the fluid flywheel unit F drives shaft 20 and sun gear 21 forwardly, simultaneously driving sun gear 27 thru the agency of clutch C. The gear diameters are, of course, taken to provide this drive ratio as a third forward speed range.

Finally, release of the front unit brake B and engagement of clutch A, with clutch C engaged, establishes a fourth forward gear drive couple, the slip ratio of the fluid flywheel having diminished with rise of engine speed and with decrease of the torque fraction carried by the unit F.

Reverse drive is obtained by application of brakes B and E, the stopping of annulus gear 28 imparting a slow reverse rotation to carrier 25.

The long-planet, short-planet combining-and-reversing gear of the rear unit is a compact construction in which the overall rocking couples are reduced to a desired minimum. Further, the simultaneous delivery of two forward torque components as during third speed ratio drive, one component to one of the planet gears and the other to the second planet gear tends to offset one potential rocking couple against the other, which thereby relieves the supporting structures of additive loads, lessening load deflection and mis-alignments. In all power trains wherein the power is delivered from one shaft to another by a meshed gear pair thru planes at right angles to the lines of centers, if beam loads on the shafts are to be avoided it is desirable to straddle mount the bearing supports on both sides of the planar spaces representing the gear contact zones. The degree of such load is roughly proportional to the ratio of torque transfer for that pair. In compounded gear trains wherein plural mesh zones for differing ratios occur between the lateral supports, as in the rear unit of the applicant's Fig. 1, the beam loads developed for example across the mesh zone of gears 21—24 will differ in value from those developed across 27, 28, the differential forces being additive or subtractive in accordance with the dimensional values of the gears. Where there is such dissimilarity in beam load between such axially separated planar spaces including the mesh zones of two groups of gears, the beam load values generate a rocking couple tending to deflect or displace the shaft or gear alignment, which action in the present instance is partially compensated as noted above.

It is believed novel to deliver two simultaneous torque components thru adjacent, differentially rotating sun gears each driving separate planet gears which are intermeshed, to produce a recombined torque on the planet gear carrier.

It appears to be likewise novel to provide this useful result in a combination wherein the input drive to both said sun gears may be torque-multiplied, and also have torque division thru the agency of a fluid turbine device, as in the present invention.

It should be noted that all of the forward drive input to the rear unit is delivered by its sun gears which lie close to the shaft center, and that only the reverse drive ratio is obtained by force reaction at a larger diameter, specifically on annulus gear 28.

Fluid pressure actuation force for the clutches and brakes and pressure lubrication for all driving circumstances are provided by pumps P and Q. Pump P consists of a pair of intermeshed gears 51 and 52 mounted within pump housing 100b coacting with web 100a of casing 100, gear 51 being formed on or keyed to shaft 5 running at engine speed. The pressure output of pump P is made available for actuation of brake piston-and-cylinder mechanism such as described in Letters Patent to Earl A. Thompson, U. S.

2,204,872 issued June 18, 1940, and for actuation of pistons 53 and 54 which operate or engage the clutches A and C. The brakes B, D and E are operable by the patented structures referred to. The leftward web of drum 29 is formed internally to accommodate piston 54, the cylinder 55 thereof being connected to passages 56, 57 and 58 leading to the external control valving, not shown. Similarly, piston 53 for clutch A is recessed in cylinder 61 of drum 12, being fed by pressure delivered thru passages 62 and 63, similarly, externally connected. Passage 60 is connected to furnish a volume of fluid under pressure to the working space of the bladed impeller I and rotor R within drum 2, and for lubrication channels as shown but not numbered. The rear pump Q consists of meshed gears 65, 66 located within pump housing plate 100c abutting end plate 100d. Driving gear 65 is pinned to shaft 50, and delivers pressure to passage 66' for augmenting or replacing the pressure of the system initially noted as provided by pump P.

Although not the subject of the present invention, a governor device is shown in Fig. 1, consisting of a body 67 keyed to shaft 50 and containing centrifugal valves such as valve 70, arranged to move outward with rise of speed of shaft 50, to furnish variable pressures for controlling the ratio selection valving which directs the servo pressures to the clutch and brake actuator pistons. The control arrangement of the aforesaid Letters Patent U. S. 2,204,872 issued to Earl A. Thompson, is directly applicable for providing adequate control of the present invention construction, and therefore not duplicated here.

The present invention is believed to possess features of novelty in the combination of the carrier 25 of the rear unit with the shaft 50, the location of the governor device 67, 70 and the pump and housing enclosures 100c and 100d, and is claimed below.

The central web 100e of housing 100 is coincidentally ported for the external servo passages with gland 101, which it supports. The forward housing section 100f forms a bell housing for attachment to the engine casing.

The forwardly extending portion of web 100a is equipped with seal rings 73 bearing inside the adjacent collar of drum 2, the outer face of which is sealed by seal J fitted inside a second axial extension of the web 100a. A second seal device K is fitted between hubs 75 and 76 of the rotors I and R.

Attention is directed to the method of establishing accurate axial spacing of the elements of the assembly, by the use of the thrust washers numbered 81 to 88 from left to right in Fig. 1. These washers may be made of anti-friction metals, and are accurately dimensioned with respect to the adjacent parts sizes so that there is no opportunity for other than running fit play. The planet gears are similarly protected against excessive endwise motion by equivalent washers, un-numbered.

In the radial space inward of portion 12a of drum 12, one-way locking elements 90 are pocketed for cooperation with races formed inside 12a and correspondingly on the outer portion of the non-rotating gland member 101. The elements 90 are inclined and biased so that whenever drum 12 tends to rotate backward, the elements 90 wedge or lock to hold the drum 12 at zero speed. When this one-way device is used, brake B may be dispensed with, except for drive constructions and uses in which it is desirable that the drum 12 be prevented from backward rotation by positive means.

If both band B and one-way device 12a—90—101 are used in the same assembly, the band B may be of the non-self-energised type, which arrangement assures that drum 12 cannot ever have backward rotation. For certain drive usages, it will be understood that under coasting effect, drum 12 would have a forward torque component, the one-way device elements 90 being then non-wedging, hence the car would coast with a free engine. Application of brake B would therefore provide means to assure engine braking and prevent such freewheeling action.

Should brake B be left out of the assembly, the ratio control system becomes simpler, since fluid pressure servo operation is only required for clutches A, C and brake D, since band E for reverse may be mechanically operated. Reviewing the drive control pattern in this respect, the fluid pressure supply for ratio actuation, denoted by X, is:

|  | Clutch A | Clutch C | Brake D |
| --- | --- | --- | --- |
| Low |  |  | X |
| 2nd | X |  | X |
| 3rd |  | X |  |
| High | X | X |  |

The one-way device 12a—90—101 acts as a holding means for drum 12, in Low and 3rd, due to the reverse component applied to 12 thru the gearing, when the engine is driving. It also may act as a brake during the application of brake E for obtaining reverse drive.

The sectional view of Fig. 2 is provided to show a fluid pressure servo actuator for one of the brakes B or D, and the actuator mechanism shown may also be used for applying brake E. As the parts are numbered, the Fig. 2 construction pertains to the operation of brake D. The anchor end 103 of brake band D is in abutment with a facing abutment of the housing 100, and the actuating or movable end 104 is pivoted at 105 to strut arm 106 fitted into notch 107 of lever 108 pivoted at 109 on housing 100. The swinging end of 108 bears against rod 120 of piston 111 having two piston flanges 112, 113 of different diameters in cylinder spaces 114, 115. Spring 116 normally urges piston 111 to release the loading of the actuator mechanism on the band D. Fluid pressure may be admitted to the two cylinders 114 and 115 by pipes 117, 118 for providing a differential loading effect or an additive effect, as required. This actuator mechanism is, of course, fully operable by the construction referred to in Letters Patent U. S. 2,204,872 to Thompson noted above.

In the case of a locking mechanism for holding the carrier 25 against rotation for parking brake purposes, the structure shown in Fig. 4 of Letters Patent U. S. 2,221,233 to Oliver K. Kelley issued August 13, 1940, is adequate for one skilled in the art to obtain the desired control for the construction of the present invention.

The external controls for establishing the servo actuation herein thru valving do not appear germane to the subject matter described and claimed in the present specification, and are therefore omitted for the sake of brevity.

Fig. 3 is only to show one form of one-way reaction locking device used as an example herein, the wedge members 90 filling the circular channel between the parts 12a and 101.

In the earlier portion of the present specification, reference has been made to the principle of division and recombining torque used herein. It will be observed that whenever the clutch C is engaged, one component of torque is delivered to the rear unit secondary sun gear 27 from shaft 11, and another to primary sun gear 21 by way of the fluid flywheel I. R. from shaft 20. These components divide between shafts 11 and 20 and are recombined in their net ratio effect in the gear train of the rear unit. It is believed novel to recombine these thru components applied to separate sun gears in the manner and with the construction shown here.

The various objects, advantages and useful results of the teachings set forth herein in demonstration of my invention are believed amply described, and it is thought that one skilled in the art is herein properly instructed so that the invention combinations below claimed may be duly used advantageously by the public, either with the demonstration constructions shown or their counterpart or equivalent constructions.

It is to be understood that the structures of the example given herewith are merely illustrative of the principles of the invention and that those skilled in the art may make modifications and substitutions in the structure and arrangement without departing from the aforesaid inventive teachings, believed novel and as set forth in the appended claims.

I claim:

1. In power transmissions, an engine shaft, a driven output shaft, coupling means for establishing selective variable speed drive between said shafts comprising a first planetary gear unit consisting of an annulus gear connected for constant rotation by said engine shaft, a sun gear connected to a reaction drum, planet gears meshing with said annulus and sun gears, a carrier for said planet gears, said carrier being the output member of said first gear unit, a clutch for coupling said carrier with the said reaction drum and sun gear; a second planetary gear unit comprising an input sun gear, a planet gear meshed with said sun gear and meshing with a second planet gear, a reaction sun gear meshing with said second planet gear, a reaction annulus gear meshing with said second planet gear, a carrier supporting both said planet gears and connected to said output shaft; a fluid flywheel device having an impeller connected to said first unit carrier and a rotor connected to said second unit input sun gear, a clutch for said second unit having a set of plates attached to said second unit reaction sun gear with the mating plates thereof attached to rotate with the said first unit carrier and impeller, braking means for said first and second unit reaction sun gears, a brake for said second unit reaction annulus gear, and actuation means selectively operative to provide low speed drive between said shafts by coincident operation of brakes for said first unit sun gear drum and for said second unit sun gear, to provide second speed drive by coincident operation of said first unit clutch and the brake of said second unit sun gear drum, to provide third speed drive by coincident operation of said first unit sun gear drum brake and said second unit clutch, to provide high speed drive by coincident operation of both said clutches, and to provide reverse drive by coincident operation of said first unit sun gear drum brake and said second unit annulus brake.

2. In the combination set forth in claim 1, the subcombination of a one-way braking mechanism including inclined wedging members arranged to prevent backward rotation of the drum of said first unit sun gear reaction drum and arranged to permit forward rotation of said drum.

3. In the combination set forth in claim 1, the subcombination of fluid pressure servo means for said actuation means of said clutches and of said first-named braking means, and of an arrangement thereof adapted to provide the sequence of drive in low gear, 2nd, speed gear, 3rd, speed gear and high gear as set forth for the useful result obtained by said actuation means, the said actuation means for said first-named clutch being operative to create a forward rotational component effective to release the braking means for said first reaction unit sun gear by coupling thru the annulus, sun and planet gears of the said first gear unit.

4. In power transmissions, an engine shaft, a driven output shaft, coupling means for establishing selective variable speed drive between said shafts comprising a first planetary gear unit consisting of an annulus gear connected for constant rotation by said engine shaft, a sun gear connected to a reaction drum, planet gears meshing with said annulus and sun gears, a carrier for said planet gears, said carrier being the output member of said first gear unit, a clutch for coupling said carrier with the said reaction drum and sun gear; a second planetary gear unit comprising an input sun gear, a planet gear meshed with said sun gear and meshing with a second planet gear, a reaction sun gear meshing with said second planet gear, a reaction annulus gear meshing with said second planet gear, a carrier supporting both said planet gears and connected to said output shaft; a fluid flywheel device having an impeller connected to said first unit carrier and a rotor connected to said second unit input sun gear, a clutch for said second unit having a set of plates attached to said second unit reaction sun gear with the mating plates thereof attached to rotate with the said first unit carrier and impeller, braking means for said first unit reaction sun gear consisting of a one-way locking device adapted to prevent backward rotation of said sun gear, braking means for said second unit reaction annulus gear, and actuation means selectively operable to provide low speed drive between said shafts by coincident operation of said device and a brake for said second unit sun gear, to provide second speed drive by automatic release of said device and coincident operation of said first unit clutch and the brake of said second unit sun gear drum, to provide 3rd, speed drive by automatic re-engagement of said device with coincident operation of said second unit clutch, to provide high speed drive by coincident operation of both said clutches with said device released, and to provide reverse drive by automatic re-engagement of said device with coincident operation of said second unit annulus brake.

5. In the combination set forth in claim 4, the subcombination of a brake for the said first unit reaction sun gear drum, and of actuation means for said brake operable to hold the said drum from forward rotation during drive in any of said low speed, third speed or reverse drives, for obtaining engine braking in these drive ratios the arrangement of the said first unit drum and said one-way locking device being effective to prevent automatic release of the device when said brake actuation means operates to hold the said drum, and provide thereby two-way drive with engine braking.

6. A transmission drive mechanism of the planetary type having an output shaft, a source of power, a first planet gear, a first sun gear meshed with said first planet gear, a second planet gear meshed with said first planet gear, a second reaction sun gear meshed with said second planet gear, an annulus gear meshed with said second planet gear, a carrier attached to said output shaft, a first power input shaft attached to said first sun gear, a fluid flywheel clutch having a rotor member arranged to transmit torque to said power input shaft and sun gear, an impeller member for said fluid flywheel, a second power shaft adapted to rotate with said second sun gear and to be driven coincidentally with the said impeller member, a brake for said second sun gear, a brake for said annulus gear, a clutch arranged to connect said second sun gear with said impeller and said second power shaft, a power input connection member adapted to be coupled to said source for driving said impeller and for driving one element of said clutch and actuation means for said brakes and said clutch arranged to provide one operating condition in which the power of said connection member is transmitted through said impeller and rotor to said first sun gear and augmented by application of the brake for said second sun gear for driving said output shaft at a torque-multiplied ratio, a second operating condition in which said clutch couples said connection member to said second sun gear simultaneously with the transmission of a torque component from said member thru said impeller and rotor to said first sun gear, and a third operating condition in which the power of said connection member is transmitted thru the said impeller and rotor to said first sun gear while the said brake of the annulus gear is applied for driving the said carrier and said output shaft at reduced drive ratio in a reverse direction to that of the power input connection member.

7. In the combination set forth in claim 6, the sub-combination of an engine shaft and of a selective two speed gear unit adapted to couple said engine shaft to the said power input connection member, said unit having controllable ratio actuation means commonly controlled with the said brakes and said clutch and selected to provide power to said member at a higher or a lower speed ratio, of a one-way device adapted to lock automatically for establishing one of said higher or lower speed ratios, and of control means for said commonly controlled ratio actuation means effective while providing drive of said member in the other of said ratios to cause automatic release of the locking action of said device.

8. In the combination stated in claim 6, the sub-combination of an engine; of variable speed ratio gear means coupling said engine with said power connection member at selected drive ratios, and of ratio actuation mechanism for said gear coupling means coincidentally operable with the said actuation means for said brakes and clutch and operable such that during the first-named operating condition for drive at the torque multiplied ratio, the said gear coupling means is made operable to provide two separate input drive ratios to said member, and operable during the said second operating condition to require the said gear coupling means to provide the two similarly separate input drive ratios to said member, for furnishing four forward speed ratios of drive between said engine and said output shaft.

9. In the combination set forth in claim 6, the sub-combination of control mechanism for said brakes, said clutch and said member operative to apply or release same, of a brake means for said carrier, and of means made operable by said mechanism to actuate said brake for preventing rotation of said output shaft for operating conditions in which the said input power connection member is uncoupled from the source of power.

10. In the construction described in claim 4 the further combination of a parking brake adapted to stop the rotation of said carrier and said output shaft during operating conditions when said locking device is automatically ineffective to prevent backward rotation of said sun gear.

11. In a power transmission, a step-ratio gear assembly especially arranged for maintenance of centric alignment of relatively rotatable elements, the said assembly including a plurality of concentric shafting, gear elements coupled to said shafting for concentric rotation, a first pump, a second pump and an output shaft concentric with said shafting and to be driven at a plurality of speed ratios by said elements, carrier means for certain of said gear elements, actuation means operative to provide said plurality of speed ratio drives, a compartmented housing for said transmission assembly comprising a forward section for joining to the casing of said engine, a central section supporting the concentric shafting of said assembly, and a rear section acting as a closure member and further supporting said shafting; a forward web of said housing formed to provide a closure for one portion of said first pump, a pump-element-supporting closure member cooperating with said web, a central web of said central section operative to support said shafting, an inner flange element of said output shaft spaced apart from the adjacent inner radial face of said rear section, a governor device attached for rotation with said flange element located between said flange and said rear section, a closure member for said second pump cooperating with said inner radial face to enshroud said second pump, said last-named closure member being spaced from said device, driving means for said pumps connected to said shafting and said output shaft, and a plurality of thrust-spacer elements located concentrically along the said shafting between radial portions of said shafting, said elements, said sections and said members for providing substantially true axial and radial alignment thereof to prevent axial displacement while permitting a running fit for relative rotations therebetween.

12. In the construction described in claim 11, the sub-combination of fluid pressure passages in said webs, said members and said shafting connected to deliver pressure from said pumps to the said gear elements, to said actuation means, and to the said thrust-spacer elements the said passages being supplied when either or both of said pumps are rotating.

13. In power transmissions, an engine and an output shaft, a transmission assembly arranged to couple said engine and said output shaft, a front unit in said assembly, said front unit consisting of an annulus gear constantly driven by said engine, a carrier supporting planet gears meshing with said annulus, a sun gear meshing with said planets having a brakable drum and one member of a direct coupling clutch the other element of which rotates with said carrier, a fluid flywheel having an impeller fixed to rotate with said carrier and having a cooperating rotor, a rear unit in said assembly, said rear unit consisting of a primary sun gear coupled to said rotor, an intermeshing pair of planet gears supported on a carrier constantly rotating with said output shaft, said primary sun gear meshing with one of said planets, a secondary sun gear meshing with the other of said planet gears and having a brakable drum carrying one element of a coupling clutch the other element of which rotates with the said impeller and said front unit carrier, an annulus gear meshing with one of said planet gears, a brake drum for said annulus gear, brake means for preventing rotation of said front unit sun gear drum, and brake means for said rear unit secondary sun gear drum and said annulus gear drum, clutch drive establishing means for said coupling clutches, and selectively operable brake and clutch means actuator mechanism effective to provide plural ranges of forward drives and reverse drive between said engine and said output shaft.

14. In a change speed transmission, a driving shaft, a driven shaft, a transmission assembly adapted to couple said shafts consisting of a front unit and a rear unit, the front unit embodying a torque converting planetary gear train having input, output and reaction members, the rear unit having an output member, an input member, a first reaction member and a second input member selectively operable as a reaction member, and each of said units having a unit coupling clutch and a forward-drive reaction-supporting drum, with brake means for said drums including actuators selectively energized to prevent drum rotation, a reverse drive brake for said first reaction member of said rear unit, a brake actuator for said reverse drive brake, individual actuators for said unit coupling clutches, a one-way locking device adapted to prevent the said reaction drum of said front unit from backward rotation, the arrangement of the said first unit drum and said device being effective to prevent automatic release of the device when said front unit brake actuator is energized, and control mechanism for selecting the energization of the actuators for said clutches, said reverse drive brake and for said brake means, said mechanism providing a drive selection pattern for establishing four forward ratios and one reverse speed ratio between said shafts.

15. In compound gear trains for providing a plurality of forward driving and reverse ratios between driving and driven shafts, the combination of two cooperating gear units consisting of a front unit having an input member fixed to rotate with said driving shaft, of a rear unit having an output member fixed to rotate with said driven shaft, of a first and a second gear element group for each of said units, each group including gears adapted to be stopped from rotation or to be coupled for rotation with other gears within the same group, the arrangement including a releasable clutch adapted to couple a gear element of said first group for rotation with an element of the second group, a one-way locking device arranged to stop the rotation of a gear element of the first one of said groups and thereby provide torque reaction for automatic drive by that group for establishing predetermined forward drive ratios between the said shafts, and reverse drive-establishing mechanism for the second of the two groups made operative when said clutch is released to provide the said reverse drive thru the automatic locking of said one-way device for preventing the rotation of the gear element of the said first one of the groups.

16. In power transmissions which include a fluid turbine drive device having first and second coupling elements, an engine and a load shaft, an assembly of gear units consisting of a first unit having a power input member constantly driven by said engine and a power output member adapted to drive the first fluid drive coupling element at a higher or at a lower of two speeds; a clutch mechanism; a second unit having one power input member driven by the second of said coupling elements, and having a second power input member adapted to be connected by said clutch mechanism so as to be driven directly by said first unit output member, a carrier in said second unit for planet gears, a power output member driven by said carrier and fixed to drive said load shaft; reaction sustaining gear members in said second unit meshing with said planet gears and operative to establish selectively the torque reactions for both reduction forward and reverse gear drive of said load shaft by said second unit carrier, and control mechanism for both said units effective upon the second unit to brake said reaction sustaining members selectively for both of the recited gear drive conditions while effective upon the first unit to establish a low speed drive of said coupling.

WILLIAM L. CARNEGIE.

REFERENCES CITED

The following references are of record in the file of this patent:

UNITED STATES PATENTS

| Number | Name | Date |
|---|---|---|
| 980,407 | Clarke | Jan. 3, 1911 |
| 2,176,138 | Kelley | Oct. 17, 1939 |
| 2,204,872 | Thompson | June 18, 1940 |
| 2,324,713 | McFarland | July 20, 1943 |
| 2,332,593 | Nutt et al. | Oct. 26, 1943 |
| 2,334,394 | Dodge | Nov. 16, 1943 |
| 2,343,955 | Cotterman | Mar. 14, 1944 |
| 2,372,817 | Dodge | Apr. 3, 1945 |
| 2,377,696 | Kelley | June 5, 1945 |

FOREIGN PATENTS

| Number | Country | Date |
|---|---|---|
| 477,530 | Great Britain | Jan. 3, 1938 |